United States Patent Office 3,244,028
Patented Apr. 5, 1966

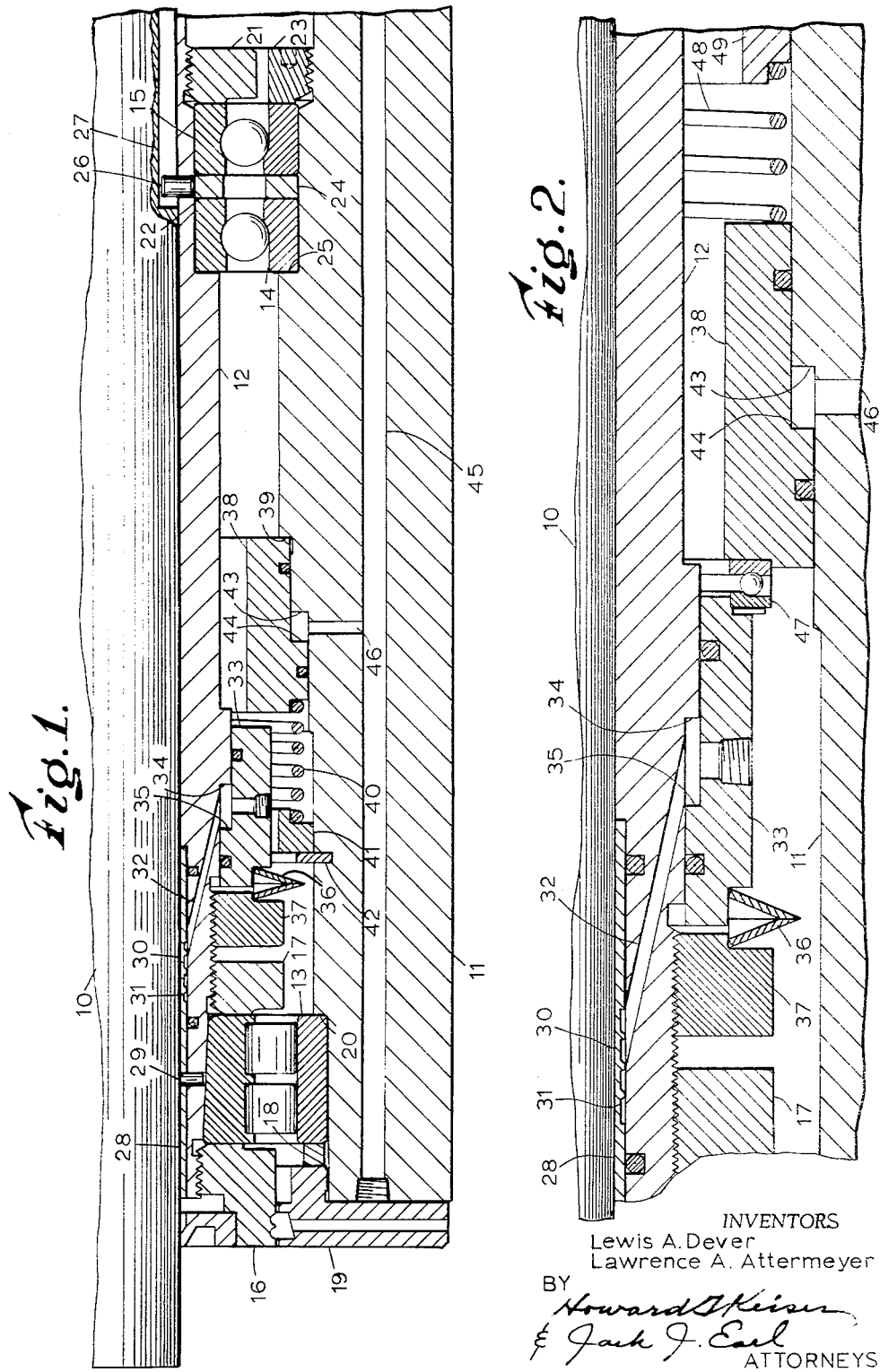

3,244,028
SPINDLE CLAMPING MECHANISM
Lewis A. Dever and Lawrence A. Attermeyer, Cincinnati, Ohio, assignors to The Cincinnati Milling Machine Co., Cincinnati, Ohio, a corporation of Ohio
Filed July 14, 1964, Ser. No. 382,467
5 Claims. (Cl. 77—1)

This invention relates to clamping mechanisms for securing a cylindrical spindle member inside a supporting member and in particular to a mechanism for clamping a machine tool spindle inside a rotatable support member.

Power operated spindle-clamp or locking mechanisms have many applications in the machine tool field. These mechanisms must be capable of securely holding a spindle in axial position in a supporting member against high axial loading forces. They also should be able to clamp the spindle in position on a fixed center line without lateral shifting of the spindle when it is locked in position. In many cases, it is important that the spindle remain clamped in position in the event of a sudden loss of the power to the actuating means, for example, a ruptured hydraulic line in a fluid operated clamp. Also, in some cases it is convenient to provide for axial position changes while the spindle is rotating and for this purpose the mechanism must be operable on the fly to release and reclamp the spindle.

It is, therefore, an object of this invention to provide an automatically set, power released clamping mechanism whereby a cylindrical member such as a machine tool spindle can be accurately and securely clamped in a selected axial position on a fixed centerline.

It is also an object of this invention to provide a mechanism to releasably clamp one member in position in a rotating support member which mechanism is operable during rotation of the support member.

A further object of this invention is the provision of a relatively simple but positive clamping mechanism adapted for fluid power operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The invention in its preferred form employs a sleeve received around a spindle and rotatable therewith and through which the spindle is axially adjustable. The sleeve includes a thin annular section behind which is a cavity filled with a pressure flowable substance such as soft poly-vinyl chloride plastic that is of very low volumetric compressibility so as to act in accordance with known hydraulic principles when under pressure. A variable volume annular cavity is also provided which is rotatable with the sleeve and has passages in communication with the space behind the thin sleeve section. These are also filled with the same incompressible plastic substance. Bias means are provided tending to reduce the volume of the cavity to thus pressurize the contents of the cavity and space as well as the communicating passages. The thin section then tends to be bulged against the spindle to maintain constant the volume of the system and thereby grips the spindle firmly to hold it in the sleeve and to prevent relative motion therebetween. Release means are also provided that are not rotatable but that are selectively operable to oppose the bias means to tend to enlarge the annular cavity. The pressure of the substance therein is reduced and the grip of the thin sleeve section is released to allow the spindle to be moved relative thereto. In order to release the spindle during its rotation, rotating coupling means can be used with the release means whereby the releasing force provided can be transmitted to the rotating clamp mechanism.

A clear understanding of the construction and operation of the clamping mechanism of the present invention can be obtained from the following detailed description in which reference is made to the attached drawings wherein:

FIG. 1 is a partial longitudinal section of a machine tool spindle and quill mechanism.

FIG. 2 is a portion of the same mechanism as in FIG. 1 but in which the clamping mechanism is shown in an alternate embodiment and on a slightly enlarged scale.

The mechanism of FIG. 1 shows in partial section a boring machine spindle 10 which is supported for rotation in a quill 11. The spindle 10 is connected directly to a first source of power for rotation and to a second source of power for axial movement in the same manner as the boring spindle shown and described in detail in our copending United States patent application Serial Number 382,468 filed on the same date herewith. Since the drive mechanisms form no part of the present invention they are not shown herein, but the description of the cited application, being of a similar spindle and quill mechanism, is incorporated herein by the specific reference thereto. The cylindrical spindle 10 is received through a sleeve 12 that is concentrically supported for rotation inside the quill 11 at a fixed axial location by bearings 13, 14 and 15. The forward bearing 13 is held on the sleeve 12 by a pair of annular nuts 16, 17 that are threaded thereon to embrace the inner race of the bearing 13 therebetween. The outer race of the bearing 13 is held in the quill 11 by a spacer 19 received against one side of the race and held in position by a face plate 19 attached to the quill 11 by machine screws, not shown. The other side of the outer race of the bearing 13 is received directly against a shoulder 20 in the quill 11. The bearings 14 and 15 are held in place on the sleeve 12 by a nut 21 and are separated by a spacer 22 between their inner races. A nut 23 holds the bearings 14, 15 inside the sleeve 12 and a spacer 24 is inserted between their outer races. The outer race of the bearing 14 is stopped against a shoulder 25 in the quill 11. A positive rotational drive is provided for the sleeve 12 by a pin 26 that is fixed in the sleeve 12 and extends into a drive slot 27 that extends along a side of the spindle 10 to permit axial adjustment of the spindle 10 to positions out to the left as viewed in FIG. 1.

The spindle 10 is held in the sleeve 12 against axial movement by a releasable clamping mechanism. The clamping mechanism includs an annular sleeve bushing 28 that is securely attached inside the sleeve 12. In the specific embodiment shown, the bushing 28 is turned initially with an outside diameter very slightly greater than the inside diameter of the sleeve 12 where it is to fit and with an inside diameter less than the final diameter required for a sliding fit over the spindle 10. The bushing 28 is then shrunk by cooling and the sleeve 12 is expanded by heating and the two then are assembled and their temperature equalized. Thus the bushing 28 is tightly secured in the sleeve 12 and the final internal boring of the bushing 28 and sleeve 12 is performed to provide the final internal bore size. To prevent later slipping between the two, a pin 29 is inserted through the sleeve 12 and into the bushing 28. The bushing 28 includes a thin annular section 30 which extends around and is in contact with the spindle 10. A space is formed between the section 30 and the sleeve 12 and in the embodiment shown, a series of projections 31 integral with the thin section 30 extend through the space to contact the sleeve 12. The projections 31 are formed when the thin section 30 is produced by chasing right and left hand threads around the bushing 28 which leaves a plurality of diamond shaped points on the inside of the section 30. It is the purpose of these points or projections 31 to keep the section 30 from deflecting inward during final boring and thus they prevent an undersize restriction in the spindle bore.

The clamping mechanism also includes a variable volume space which connects with the space behind the thin section 30 by a series of passages 32 at spaced locations around the sleeve 12. The variable volume space is formed between the sleeve 12 and an annular plunger 33 which fits over the sleeve 12 and is slidable therealong. The sleeve 12 has a pair of stepped cylindrical external surfaces joined by a shoulder 34 and the plunger 33 has mating stepped internal bores joined by a shoulder 35. The shoulders 34 and 35 are initially spaced apart as shown to provide a space between the sleeve 12 and plunger 33 which is filled, along with the passages 32 and the space behind the section 30 of the bushing 28, with a substance that flows as a fluid when pressurized and is of such very low compressibility as to be considered incompressible. The fluid in the spaces can be, for example, a soft resin plastic of the polyvinylchloride family which is floable and transmits changes in pressure in accordance with hydraulic principles. An elastomeric substance such as a soft polyvinylchloride resin is especially suited for this clamping mechanism since it tends to adhere to itself and leakage which would occur with petroleum fluids and greases is eliminated. These spaces are closely fitted to form a tight seal to confine the fluid substance and, therefore, the two shoulders 34, 35 cannot be closed together completely. To pressurize the soft elastomeric substance in the described spaces, a set of spring washers 36 are supplied at one end of the plunger 33 and these are compressed together by a nut 37 that is threaded onto the sleeve 12 and tightened against the washers 36. This provides a strong bias force on the plunger 33 tending to move the shoulders 34, 35 together and thus pressurizes the substance in the spaces within the clamping mechanism. This pressure tends to bulge the thin section 30 away from the sleeve 12 to firmly grip the spindle 10 and prevents relative movement between the spindle 10 and the sleeve 12. Thus the spindle 10 is clamped in place in the sleeve 12.

The clamping mechanism described can be released by depressurizing the fluid substance in the spaces within the mechanism. This is accomplished by applying a force to the plunger 33 acting axially thereon in the direction opposite to the direction in which the force from the washers 36 acts. To this end, a releasing mechanism is furnished inside the quill 11. This mechanism includes an annular plunger ring 38 which is spaced from and extends around the sleeve 12 and is axially spaced from the plunger 33 toward the rear of the spindle 10 and sleeve 12. The ring 38 is normally held back in the quill 11 against a shoulder 39 by a spring 40 that is compressed between the ring 38 and a retainer 41 that is held in place inside the quill 11 by a snap ring 42. As shown, a shoulder 43 between stepped internal surfaces of the quill 11 is spaced from a shoulder 44 on the ring 38 between stepped cylindrical surfaces on the exterior thereof to form a cavity therebetween. A fluid passage 45 extends through the quill 11 and is connected to the space between the ring 38 and quill 11 by a port 46. The connection of fluid under pressure to the passage 45 produces a hydraulic force on the ring 38 moving it forward against the force of the spring 40 to engage the plunger 33 to push it forward against the spring washers 36 to tend to enlarge the space between the plunger 33 and the sleeve 12. Thus the fluid substance therein is no longer pressurized and the thin section 30 does not grip the spindle 10 which can be moved axially in the sleeve under these conditions. The connection of hydraulic fluid under pressure to the passage 45 can be made by any selectively operable valve means and it is within the common skill of the art to furnish such means which, therefore, are not described in detail herein.

The release mechanism described is intended for operation when the spindle 10 and sleeve 12 are stopped from rotating since the ring 38 is non-rotating and bears directly against the plunger 33 when fluid under pressure is connected to the passage 45. In some instances, release of the spindle 10 for axial movement is desired while it is still rotating and for this purpose, the construction of the clamping and release mechanism is shown in an alternate form in FIG. 2. To provide a rotatable coupling between the plunger 33 and the ring 38 to transmit axial forces, a thrust bearing 47 is received between the two members. In this embodiment, the ring 38 is urged toward the plunger 33 by a spring 48 held in the quill 11 by a retainer 49. The spring 48 provides only a small force so that the washer springs 36 still provide a force sufficient to pressurize the fluid substance in the spaces in the clamping mechanism to cause the thin section 30 to bulge outward from the sleeve 12 and grip the spindle 10. The spring 48 does, however, hold the bearing 47 in place between the plunger 33 and ring 38 and maintains a space between the ring 38 and quill 11 into which fluid under pressure is transmitted by the port 46 when release of the clamping mechanism is desired.

While the invention has been described in connection with one possible form and an alternate embodiment thereof, it is to be understood that the present disclosure is illustrative rather than restrictive and that changes and modifications may be resorted to without departing from the spirit of the invention or the scope of the claims which follow.

What is claimed is:

1. In a machine tool spindle mechanism having an axially adjustable tool bar supported in a rotatable member, a releasable clamping mechanism for securing the tool bar in axial position in the rotatable member comprising:
   (a) a sleeve fixed in said rotatable member and having a thin annular section in contact with the tool bar and extending therearound, said thin section spaced from the rotatable member to provide an annular cavity therebetween,
   (b) a pair of adjacent outside cylindrical surfaces of different diameters and a shoulder extending therebetween formed on the rotating member,
   (c) an axially movable and annular plunger received over said rotatable member for rotation therewith and having adjacent internal cylindrical surfaces and a shoulder extending therebetween displaced axially from said rotatable member shoulder to form a chamber of variable capacity therebetween,
   (d) a communicating passage between said annular cavity and said variable capacity chamber,
   (e) a pressure flowable substance of very low volumetric compressibility filling said annular cavity, variable chamber and communicating passage,
   (f) a spring mechanism on said rotatable member engaged against said annular plunger and producing a bias force thereon tending to move said shoulder therein into contact with said rotatable member shoulder to pressurize said pressure flowable substance to expand said annular cavity and clamp the tool bar in axial position in the rotatable member, and
   (g) means for producing and transmitting a force to said annular plunger in opposition to said bias force to expand said variable capacity chamber and reduce the pressure therein to release said tool bar for axial adjustment in the rotatable member.

2. The machine tool spindle clamp mechanism of claim 1 wherein:
   (a) said means for producing and transmitting a force is a fluid pressure actuated plunger mechanism axially spaced from said annular plunger and movable thereagainst to oppose said spring mechanism when fluid under pressure is connected thereto to release the tool bar, and
(b) a means is provided to connected fluid under pressure to said fluid actuated plunger.

3. The machine tool spindle clamp mechanism of claim 2 wherein:
(a) a thrust bearing is embraced between said annular plunger and said fluid actuated plunger to permit release of said spindle for axial movement in the rotatable member.

4. In a boring machine having a boring spindle received for axial adjustment in a support member held rotatably in a quill, a clamp mechanism for releasably securing the boring spindle in the support member comprising in combination:
(a) a sleeve fixed in said support member and having a thin annular section in contact around the boring spindle, said thin section spaced from the support member to provide an annular cavity therebetween,
(b) adjacent external cylindrical surfaces on the support member of different diameters and a shoulder extending therebetween,
(c) a first annular plunger received around the support member and having adjacent internal cylindrical surfaces and a shoulder extending therebetween and axially spaced from the support member shoulder to provide a compression cavity between the support member and first annular plunger,
(d) a passage communicating between said annular cavity and compression cavity,
(e) a fluid substance of very low compressibility filling said annular cavity, compression cavity and passage and confined therein,
(f) a spring mechanism connected between the support member and said first annular plunger and urging said first annular plunger along the support member tending to reduce the volume of said compression cavity to pressurize said fluid and expand said annular cavity to clamp the boring spindle in the support member,
(g) adjacent internal cylindrical surfaces of different diameters in the quill and a shoulder extending therebetween,
(h) a second annular plunger around the support member and having adjacent external cylindrical surfaces in sliding contact with said quill internal cylindrical surfaces and a shoulder extending therebetween and spaced from said quill shoulder to provide a release pressure cavity between the quill and second annular plunger, and
(i) means to connect fluid under pressure to said release pressure cavity for enlargement thereof to move the second annular plunger against said first annular plunger to overcome said spring bias mechanism and enlarge said compression cavity to release the boring spindle in the support member.

5. The boring machine spindle clamp mechanism of claim 4 wherein:
(a) a thrust bearing is received between said first and second annular plungers to provide a rotatable thrust coupling therebetween.

References Cited by the Examiner
UNITED STATES PATENTS
2,957,393  10/1960  Kampmeier _____ 90—11

WILLIAM W. DYER, Jr., *Primary Examiner.*
G. A. DOST, *Assistant Examiner.*